United States Patent

[11] 3,587,249

| [72] | Inventor | Gunther Arnold |
| | | Hessen, Germany |
| [21] | Appl. No. | 854,835 |
| [22] | Filed | Sept. 3, 1969 |
| [45] | Patented | June 28, 1971 |
| [73] | Assignee | General Motors Corporation, |
| | | Detroit, Mich. |
| [32] | Priority | Sept. 5, 1968 |
| [33] | | Germany |
| [31] | | P 17 75 642.2 |

[54] UNIVERSAL JOINT
5 Claims, 4 Drawing Figs.

[52] U.S. Cl. .................................................. 64/7
[51] Int. Cl. .................................................. F16d 3/16
[50] Field of Search ........................................... 64/7, 17,
16, 21; 287/87, 12; 180/45

[56] References Cited
UNITED STATES PATENTS

| 3,406,534 | 10/1968 | Chapper | 64/7 |
| 3,451,228 | 6/1969 | Henley | 64/16 |

*Primary Examiner*—Fred C. Mattern, Jr.
*Assistant Examiner*—Randall Heald
*Attorneys*—W. E. Finken and F. J. Fodale ABSTRACT: A universal joint has one half-joint guiding and partially enclosing a drive ball in such a way that the latter is movable about one of its rotation axes only, whilst the other half-joint includes a flattened shaft-end swivellable in the drive ball in a plane which includes said one rotation axis. The one half-joint is a hemispherical shell having a groove which is open at its end and in which a projection of the drive ball engages. At the ends of its pivotal axis, the drive ball has bearing slots for receiving pivot pins on the hemispherical shell.

PATENTED JUN28 1971

INVENTOR
Günther Arnold
BY
F. J. Fadale
ATTORNEY

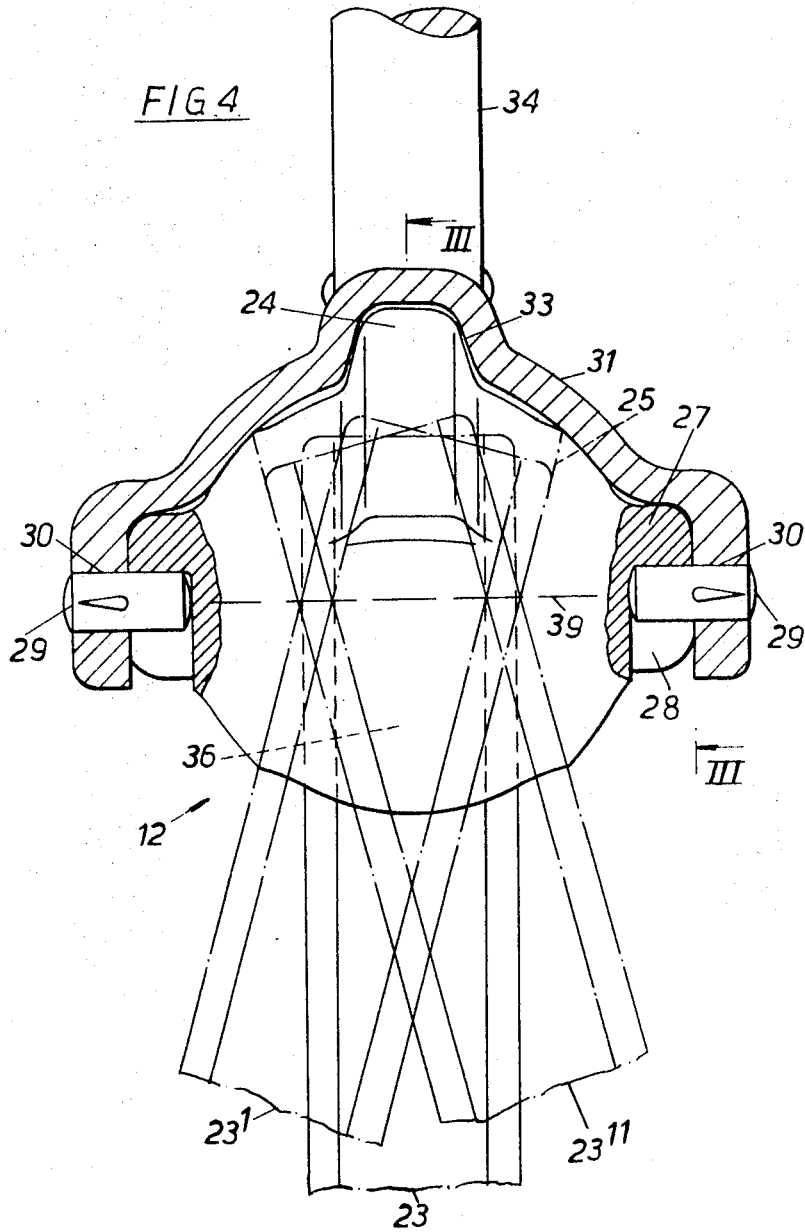

UNIVERSAL JOINT

This invention relates to universal joints, of which one half-joint guides and partially encloses a drive ball in such a way that the latter is movable about one of its rotation axes only, whilst the other half-joint includes a flattened shaft end which is swivellable in the driving ball in a plane which includes said rotation axis.

The invention distinguishes, as explained below, from previously proposed universal joints which establish a connection between two shafts arranged at an angle.

German Pat. No. 1,206,669 discloses a universal joint having two forked members engaging in grooves of a central ball which are at right angles to each other. This joint is not suitable for fairly large swivel angles whilst transmitting considerable torques.

German Pat. No. 840,437 discloses a universal joint having a spherical middle piece in which a flattened-off shaft end is mounted, pivoting about a pin, inside a slot in the middle piece. This universal joint is not suitable for simple assembly without tools.

German Pat. No. 501,141 discloses a universal joint in which a fork-shaped shaft end engages in a driving groove of an intermediate member which actuates the other shaft. This intermediate member is designed as a solid hemisphere which is borne by the two half-joints, these latter engaging in the hemisphere with a firm mounting. This universal joint permits no compensation of length, for example, during displacement of the driven shaft; whilst assembly requires a certain spacing of the two half-joint bearings, which must be adhered to.

German Pat. No. 226,555 discloses a universal joint coupling in which the joint is enclosed in a divided housing held together by means of a locking ring. With this joint, the constructional outlay is great and assembly is not readily possible.

German petty Pat. No. 1,390,617 makes known a slider coupling in which, with the aid of at least two sliders forming a cylindrical guide, a flattened shaft end engages in the fork-shaped widening of the other shaft. The lateral bounding faces of the shaft end are so guided that a longitudinal mutual displacement of the two shaft ends is possible. The construction of this slider coupling is of multipart design with several component elements, the union of which by means of a tool is an expensive procedure.

It is the object of the present invention to provide a universal joint which overcomes the above defects and permits the transmission of considerable torque when the shafts to be connected are at large swivel angles with respect to each other. The assembly of such a universal joint should be simple and, when in the mounted condition, the drive ball must not be capable of being pulled out of the half-joint into which it is inserted.

By the present invention, this problem is solved by arranging that one half-joint is constructed as a hemispherical shell, having a groove which is open at its ends and in which a projection of the driving ball engages and that, at the ends of its pivotal axis, the drive ball is provided with bearing slots, opening in opposite direction to the projection, for receiving two inwardly directed pivot pins of the hemispherical shell.

Such a universal joint may have a pinless swivel slot, known per se, for the flattened shaft end, which slot penetrates through the drive ball. This is of importance for length compensation and affords the possibility of forming the other half-joint as a flattened shaft end and of mounting the universal joint completely by pushing into the swivel slot.

The accompanying drawings illustrate an embodiment of the invention. In the drawings:

FIG. 4 shows a longitudinal section (approximately on plane IV–IV in FIG. 3) which is turned through 90° with respect to FIG. 3, and shows the swivel angle.

Figure 1:
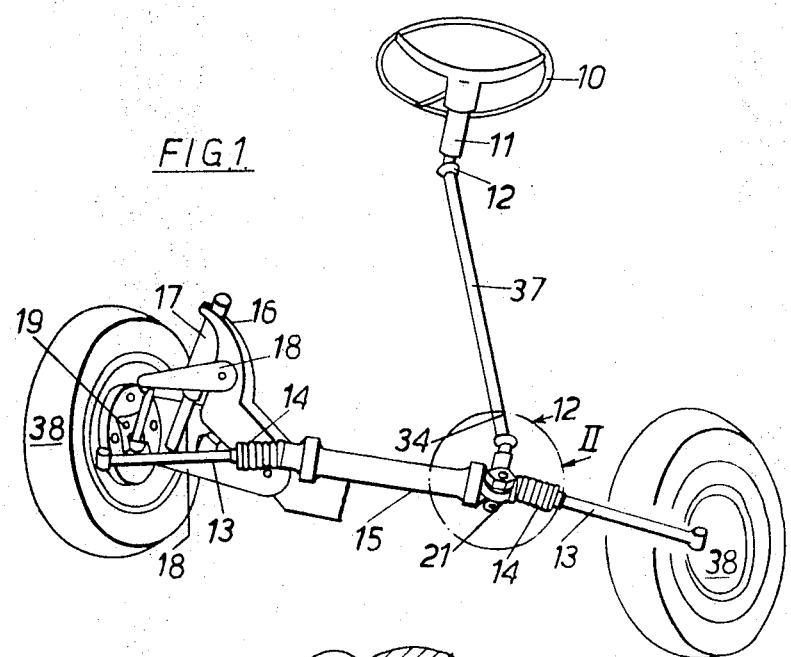
FIG. 1 shows a vehicle steering system, with two universal joints according to the invention, in the steering column.

In FIG. 1 the wheels 38 of a motor vehicle (not shown) are turned to right or left by the steering wheel 10. The torque produced by the driver on the steering wheel 10 with its steering column cladding 11, is transmitted through the steering column 37 to a rack steering system. The upper portion of the steering column at the steering wheel 10, and the lower portion of the steering column at the rack steering system, are arranged at an angle to each other. The middle portion of the steering column connects the upper and lower steering column portions through two universal joints 12. Via a pinion (not shown) in the steering housing 21, the torque of the steering wheel drives a toothed rack 20 in the rack housing 15, the rack being hingedly connected on both sides to the tie rods 13. These joints are sealed off by flexible gaiters 14. Depending on the direction of rotation of the steering wheel, the tie rods 13 are displaced to right or left and they turn the wheels 38, since they engage the stub axles 19 eccentrically. The wheels are hingedly secured to the vehicle frame 16 through the guide arms 18 and are damped in the movement relative to the vehicle frame by shock absorbers 17.

Figure 2:
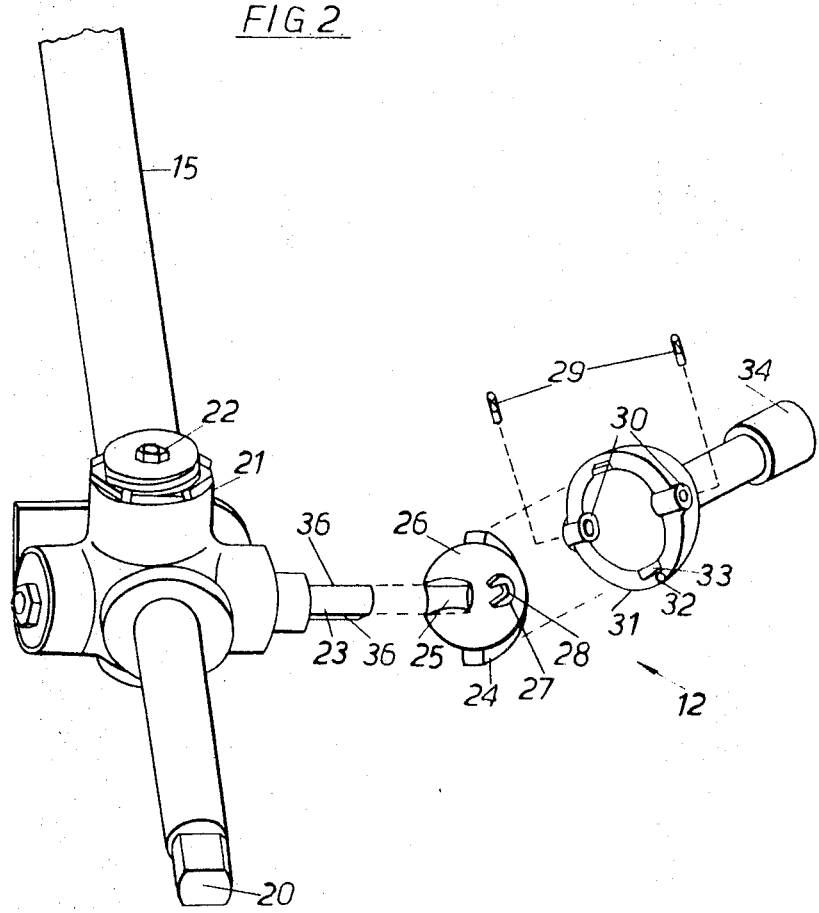
FIG. 2 shows an assembly diagram (representing an enlargement of encircled portion II in FIG. 1) with the component elements of the universal joint, and partially illustrates a toothed rack steering system.

FIG. 2 shows the toothed rack 20 which is emerging from the steering housing 21 and is moved in the steering housing 21 by the pinion (not shown). The pinion is pressed against the rack 20 by means of an adjusting screw 22. The shaft 23 is rigidly connected with the pinion and is turned by the drive ball 26. In the assembled state, the driving ball 26 fits round the end of shaft 23 by means of a pinless swivel slot 25, which is known per se. At the other side the drive ball 26 is mounted in the hemispherical shell 31 and can only execute movements about the rotation axis 34, due to the guiding of the driving ball 36 by the projection 24 fitting into the groove 33 of the hemispherical shell 31. The shell 31 is provided with bores 30 which receive the pivot pins 29.

In assembly of the joint, first of all the pivot pins 29 are introduced into the bores 30 of the hemispherical shell 31. The pivot pins 29 are for example, notched pins, or screws extended as pins. Assembly of shell and pins may take place in conjunction with the production of the shell, so that the finished half-joint is present at the place where the universal joint is connected together. Then, by means of its bearing slots 28 in the bulges 27, the drive ball 26 is pushed over the pins 29 in one half-joint and is then turned through 180° and is guided by projection 24 entering groove 33. The swivel slot 25 present in the other half-joint is pushed over the flat sides 36 of the shaft-end 23, and the end 34 of the steering column 37 is secured. It will be seen that a definite exact distance of the bearing point of one half-joint from the bearing point of the toothed-rack housing 15 is not necessary, because the swivel slot 25, which penetrates through driving ball 26, permits a length adjustment of the shaft end 23.

Figure 3:
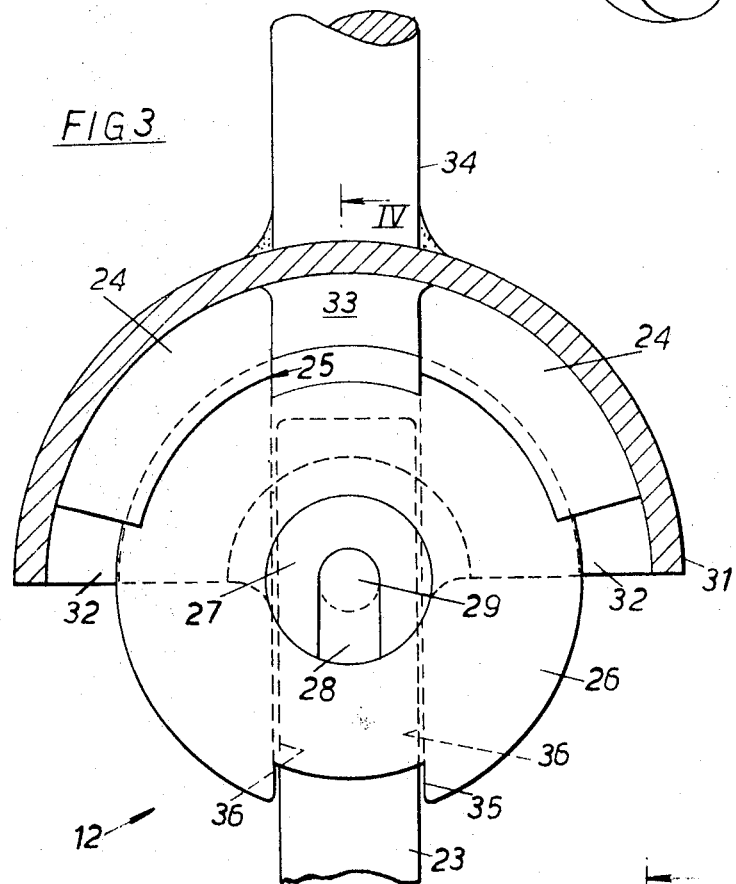
FIG. 3 shows a longitudinal section approximately on plane III–III in FIG. 4.

FIG. 3 shows the hemispherical shell 31 on to which the steering column end 34 is welded. The hemispherical shell 31 is a pressing, for example. Located in its groove 33, is the projection 24 which is formed as a toothlike strip 24. This toothlike strip 24 is rotated into the groove through one of the ends 32 (FIG. 3). In prolongation of the end 34 towards the other half-joint with the shaft end 23, the driving ball 26 has the swivel slot 25. The flattened sides 36 of shaft-end 23 lie flush against the walls 35 of the swivel slot 25.

In each of the bulges 27 of the drive ball 26 there is a bearing slot 28 which lies in opposite direction to the projection. In the present case, the bearing slot 28 is aligned with the end 34 of the steering column. It is also possible to arrange the bearing slot 28 at a certain angle to the steering column end 34. However, care must be taken to ensure that during operation of the universal joint, the driving ball 26 cannot slip off the pivot pins 29.

FIG. 4 shows the bulges 27 which are raised from the hemispherical shell 31 at its edge and support the pivot pins 29, so that the driving ball cannot be removed from this half-joint by pulling loose. The toothlike strip 24 engages in the groove 33 of the hemispherical shell 31, and is so designed that fairly great torques can be transmitted through the driving ball 26, without its bearings at the bulges 27 being excessively stressed. FIG. 4 further shows the swivel angle of the shaft end 23, of which the extreme positions 23' and 23" are indicated. Thus for example, it is possible to attain a swivel angle of 30° towards each side without the torque-transmitting capability of the driving ball being impaired by an excessively large swivel-slot 25.

During rotation of the joint, the shaft end 23 is always in a position in which its centerline intersects the rotational axis 29 of the drive ball 26 and the centerline of the steering column end 34, thus preventing excessive stresses of the edges of the shaft end 23 or of the driving ball 26, or a canting over of the shaft end 23. The only requirement is that the shaft end 23 penetrates into the hemispherical shell 31 across the rotation axis of the drive ball, as denoted by reference numeral 39.

Advantageously, a self-lubricating plastic, e.g. a suitable polyamide, can be used as material for the drive ball 26. In the case of very high torques, sintered iron may be employed.

While the embodiment of the invention herein described constitutes a preferred form, it is to be understood that other forms may be adopted.

I claim:

1. In a universal joint comprising two half-joints, of which the one guides and partially encloses a drive ball in such a way that said ball is movable about one of its rotation axes only, whilst the other half-joint includes a flattened shaft end swivellably mounted in said drive ball in a plane which includes said rotation axis; the improvement which comprises the features, in combination, that one half-joint is constructed as a partispherical shell no greater than a hemisphere, said shell having two inwardly directed pivot pins on an axis through the center of said shell and having an open-ended groove in a plane perpendicular to said axis and that the drive ball is provided with a projection disposed in said groove and with bearing slots opening in opposite direction to said projection and receiving said two inwardly directed pivot pins of the shell whereby assembly of said drive ball to said shell for rotation about said axis only is facilitated.

2. Universal joint in accordance with claim 1, in which said projection on the drive ball is constructed as a toothlike strip.

3. Universal joint in accordance with claim 1, wherein said swivellable mounting of said flattened shaft end includes a pinless swivel slot penetrating through said drive ball and receiving said shaft end.

4. Universal joint in accordance with claim 3, wherein said shaft end has flat sides resting flush against the walls of said swivel slot.

5. Universal joint in accordance with claim 1, wherein, at the ends of said rotational axis, said drive ball is provided with bulges in which said bearing slots are located.